United States Patent
Mullin

[11] Patent Number: 6,137,599
[45] Date of Patent: Oct. 24, 2000

[54] METHOD OF ADMINISTERING A WORK GROUP FAX DEVICE

[75] Inventor: Thomas P. Mullin, Laguna Beach, Calif.

[73] Assignee: Toshiba America Information Systems, Inc., Irvine, Calif.

[21] Appl. No.: 09/016,190

[22] Filed: Jan. 30, 1998

[51] Int. Cl.[7] ........................................... H04N 1/32
[52] U.S. Cl. ........................ 358/442; 358/403; 358/468
[58] Field of Search .................................. 358/402, 403, 358/404, 407, 442, 443, 444, 468, 1.15, 1.16

[56] References Cited

U.S. PATENT DOCUMENTS

| | | | |
|---|---|---|---|
| 4,918,722 | 4/1990 | Duehren et al. | 379/100 |
| 4,994,926 | 2/1991 | Gordon et al. | 358/400 |
| 5,208,683 | 5/1993 | Okada | 358/468 |
| 5,224,156 | 6/1993 | Fuller et al. | 379/100 |
| 5,283,665 | 2/1994 | Ogata | 358/434 |
| 5,351,136 | 9/1994 | Wu et al. | 358/440 |
| 5,353,124 | 10/1994 | Chou et al. | 358/400 |
| 5,353,399 | 10/1994 | Kuwamoto et al. | |
| 5,384,830 | 1/1995 | Ide | 379/88.24 |
| 5,392,131 | 2/1995 | Umeno | 358/403 |
| 5,396,342 | 3/1995 | Meyer | 358/406 |
| 5,410,419 | 4/1995 | Muramatsu et al. | 358/468 |
| 5,452,106 | 9/1995 | Perkins | 358/468 |
| 5,455,686 | 10/1995 | Nagano et al. | 358/404 |
| 5,461,488 | 10/1995 | Witek | 358/402 |
| 5,483,353 | 1/1996 | Kudou | 358/404 |
| 5,513,126 | 4/1996 | Harkins et al. | 364/514 |
| 5,521,716 | 5/1996 | Itoh | 358/402 |
| 5,521,719 | 5/1996 | Yamada | 358/438 |
| 5,530,740 | 6/1996 | Irribarren et al. | 379/89 |
| 5,539,530 | 7/1996 | Reifman et al. | 358/402 |
| 5,666,211 | 9/1997 | Tahara et al. | 358/404 |
| 5,684,607 | 11/1997 | Matsumoto | 358/442 |
| 5,799,159 | 8/1998 | Abe | 710/107 |
| 5,933,584 | 8/1999 | Maniwa | 358/1.15 |
| 5,937,150 | 8/1999 | Phan | 358/1.15 |

FOREIGN PATENT DOCUMENTS 0 745 929 A1  12/1996  European Pat. Off. .
0 749 065 A1  12/1996  European Pat. Off. .

OTHER PUBLICATIONS

Marketing documents related to Canon GP200F, Nov. 1996.
Hayes, Frank; "The Printers Talk Back", BYTE, Dec. 1993 (vol. 18, No. 13), pp. 103–104, 106, 108, 110.

*Primary Examiner*—Edward L. Coles
*Assistant Examiner*—Joseph R. Pokrzywa
*Attorney, Agent, or Firm*—Steven C. Sereboff; Arter & Hadden LLP

[57] ABSTRACT

A work group fax device and method of utilizing such a device are disclosed wherein a user may control when faxes are printed. A user of the fax machine, after leaving work for the night, might not want incoming faxes to be printed until he returns to work in the morning. The user may set all incoming faxes to be saved (accumulated) in memory in the fax machine. The user may later command the fax machine to print the accumulated faxes. Also described are password protection and the ability to set times when accumulation should begin and end. A user may engage and disengage fax holding from any permitted LAN workstation or from the fax machine's front panel.

12 Claims, 8 Drawing Sheets

METHOD OF ADMINISTERING A WORK GROUP FAX DEVICE

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates generally to image forming apparatuses having a facsimile function which enables printing of an image received by communication, and to methods and apparatus for controlling the printing of received images.

2. Description of Related Art

In today's business environment, the need to send and receive information in a matter of minutes rather than hours or days is becoming more and more prevalent. Because this need exists, the use of facsimile data and image transmission is one of the fastest growing areas of office automation.

Even though facsimile provides the capability to send and receive information quickly, reception of confidential information, especially in work group environments remains a significant problem.

Much of the information transmitted and received via facsimile is of a very private and sensitive nature. As this market segment grows, so does the need for confidentiality of transmitted information. In other areas of communication such as mail, envelopes are sealed by the sender to be opened only by the addressee. In voice communication, the telephone line is deemed to provide an acceptable level of confidentiality for most users. In email, the sender can identify the recipient and numerous methods of encryption are available.

In facsimile transmission, however, the facsimile machine will receive and print out the data, message and/or image information (usually in a common or public area because of multiple users) and the designated recipient does not know of the arrival of the facsimile information until notified by the sender or by someone who has read and examined the facsimile information. Since facsimile communications take place at all hours of the day, a facsimile may have been printed and open to view for long periods before the recipient can obtain it. Facsimile communications across time zones, and particularly across continents and oceans are especially subject to this problem. Furthermore, facsimile messages can be received on weekends and holidays when only custodial staff maybe present. Such staff may be facility employees rather than employees of the organization to whom the messages are directed and may not be under any duty of confidentiality toward the organization.

Where the times when the machine is unattended is known in advance, such as between 6 in the evening and 8 in the morning, or over weekend periods, it is also desirable to be able to preset the facsimile machine to hold all facsimiles received during such intervals on a regular basis.

Technology existing today which addresses the problem with conventional facsimile equipment is extremely limited.

One system provides memory for the receipt of facsimile information into storage for later retrieval by the person for whom the information is intended. The machines implementing this system, however, use a proprietary communication method between the sender's and receiver's equipment. This requirement means the sender must have the same brand facsimile machine as the recipient if confidential transmission is to take place. If the machines have different manufacturers then confidential transmission into memory can not be accomplished. This restriction imposes a defacto limitation to communication virtually within a closed network of senders and receivers.

In addition to the problem already mentioned, operation of a facsimile machine over long periods of time when there is no one about to receive messages results in a drain in power as well as wear. Furthermore, facsimile machine, no matter how large the associated paper supply, do have a rather small, finite limitation on paper available over long periods of being unattended. This problem is exacerbated if personnel forget to refill the paper supply before such a time period or where the facsimile machine is used in a small family operation where the unattended time period may prove extensive.

Therefore, it is an object of the invention to provide for electronically storing facsimile information until such time as it is directed to print out the stored facsimiles.

It is a further object of this invention to provide for electronically storing facsimile information for a predetermined time interval.

It is another object of this invention to provide for electronically storing facsimile information for predetermined and repeating time intervals.

It is yet another object of the invention to provide a system for electronically accumulating and storing facsimile messages with the printing function being shut down to conserve electricity.

SUMMARY OF THE INVENTION

The previously described objects are achieved in a method of administering a work group fax device wherein a user may control when faxes are printed. For example, a user of the fax machine, after leaving work for the night, might not want incoming faxes to be printed until he returns to work in the morning. The invention provides the user the ability to set all incoming faxes to be saved (accumulated) in memory in the fax machine. The user may later command the fax machine to print the accumulated faxes. Further enhancements include password protection and the ability to set times when accumulation should begin and end. The present invention allows a user to engage and disengage fax holding from any permitted LAN workstation or from the fax machine's front panel.

Still further objects and advantages attaching to the device and to its use and operation will be apparent to those skilled in the art from the following particular description.

DESCRIPTION OF THE DRAWINGS

These and other advantages of the present invention are best understood with reference to the drawings, in which, in varying detail.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Figure 1:
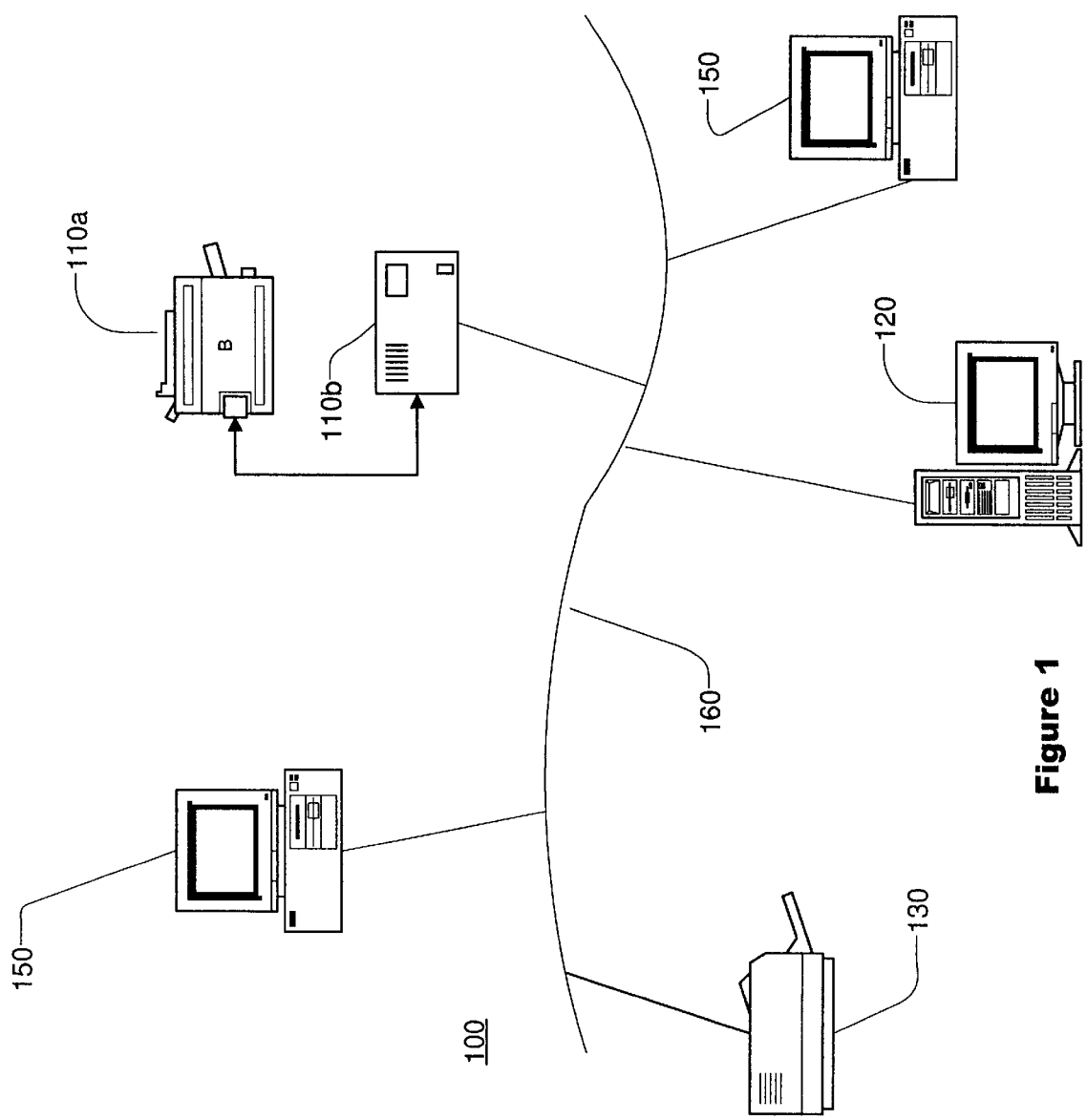
FIG. 1 is a block diagram of a LAN including plural MFPs in accordance with the invention.

Referring now to FIG. 1, there is shown a block diagram of a LAN 100 in accordance with the invention. The LAN 100 includes a file server 120, printer 130, workstations 150, and a Host 110b coupled to one another via network communications lines 160. The file server 120 and workstations 150 are preferably those well known in the art, such as computers having Intel Corporation (Santa Clara, Calif.) microprocessors and running Microsoft Corporation (Redmond, Wash.) Windows operating systems. An MFP (multifunction peripheral) 110a is coupled to the Host 110b. The LAN 100 may also include hubs, routers and other devices (not shown).

Before proceeding to describe the LAN 100, a few terms are defined. By "file server," it is meant a computer which controls access to file and disk resources on a network, and provides security and synchronization on the network through a network operating system. By "server," it is meant hardware or software which provides network services. By "workstation," it is meant a client computer which routes commands either to its local operating system or to a network interface adapter for processing and transmission on the network. A workstation may function as a server by including appropriate software, and may be for example, a print server, archive server or communication server. By "software" it is meant one or more computer interpretable programs and modules related and preferably integrated for performing a desired function. A "multifunction peripheral" is a peripheral which provides the functions of more than one peripheral, and typically provides printing and at least one of: copying, scanning and faxing.

Figure 2:
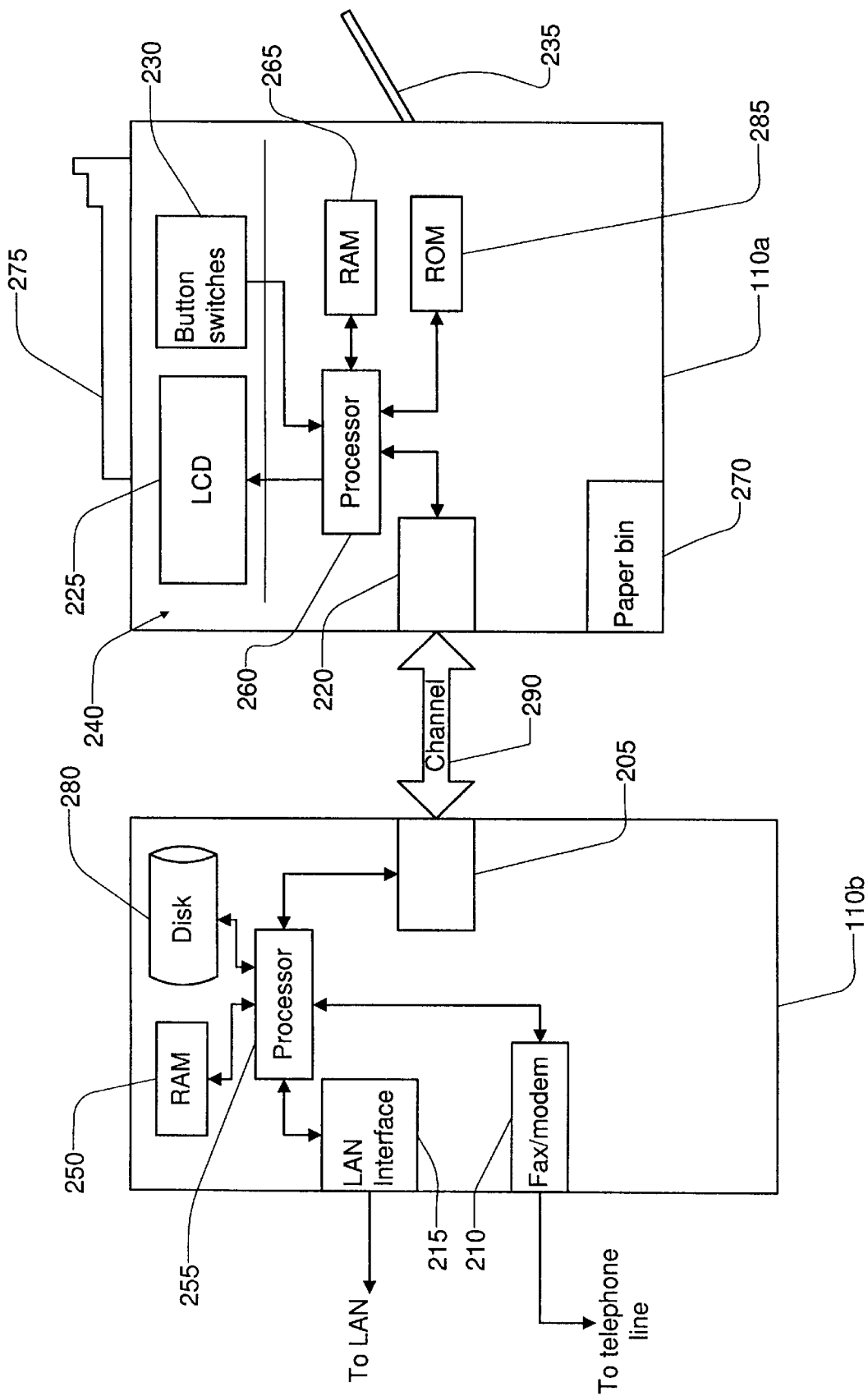
FIG. 2 is a block diagram of a data processing device including a Host and an MFP in accordance with the invention.

Turning now to FIG. 2, there is shown a block diagram of a data processing system comprising the MFP 110a and the Host 110b. The MFP 110a preferably comprises a high output digital copier having a communications interface 220 (preferably SCSI) and a hardware and software interface which allows the MFP 110a to receive rasterized print jobs from the Host 110b, manage the print jobs as well as its own copy jobs, and print the print jobs. The MFP 110a includes a short term memory 265 (preferably RAM) and processor 260 in which programs are stored and run, respectively, for controlling the functions of the MFP 110a. The MFP 110a preferably also includes a long term memory 285 such as a ROM or EPROM. The MFP 110a may also include a disk drive (not shown) for both long term and short term storage. The MFP 110a includes standard components including automatic document feeder 275, paper bin 270 and paper output tray 235.

The MFP 110a includes a non-fixed display 225, preferably an LCD, and user input device 230, such as button switches. The MFP 110a has user interface software stored in the memory 285 which is responsible for displaying information on the display 225 and interpreting user inputs from the user input device 230. The non-fixed display 225 and user input device 230 comprise an operator console 240, which, together with the user interface software, comprise a panel subsystem.

Rather than hard-coding the particular information to be displayed and the interpretation of user inputs, this information is preferably stored separately from the user interface software as "user interface definitions." By "user interface," it is meant hardware and software that allow a user to interact with and perform operations.

The Host 110b preferably comprises a server such as a computer having an Intel processor (255) and running Microsoft Windows NT. To maximize efficiency, there is preferably a one-to-one correspondence between Hosts and MFPs. In conjunction with the processor 255, the Host 110b has a short term memory 250 (preferably RAM) and a long term memory 280 (preferably a hard disk) as known in the art. The Host 110b further includes a communications interface 205 through which the Host 110b communicates with the MFP 110a through a channel 290. Preferably, the communications interface 205 is configured as a SCSI host. The Host 110b further preferably includes a fax/modem 210 for sending and receiving faxes via telephone lines. The Host 110b includes management software stored in the long term memory 280 for managing print jobs, fax jobs and scan jobs. The Host 110b also contains storage for holding incoming fax transmissions for extended periods and in substantial amounts when a hold is placed on printing facsimile jobs. When directed to transmit jobs for printing, the Host 110b rasterizes print jobs from the LAN 100 into print data (a form native to the MFP 110a) and transmits the print data to the MFP 110a via the communications interface 205.

Figure 4:
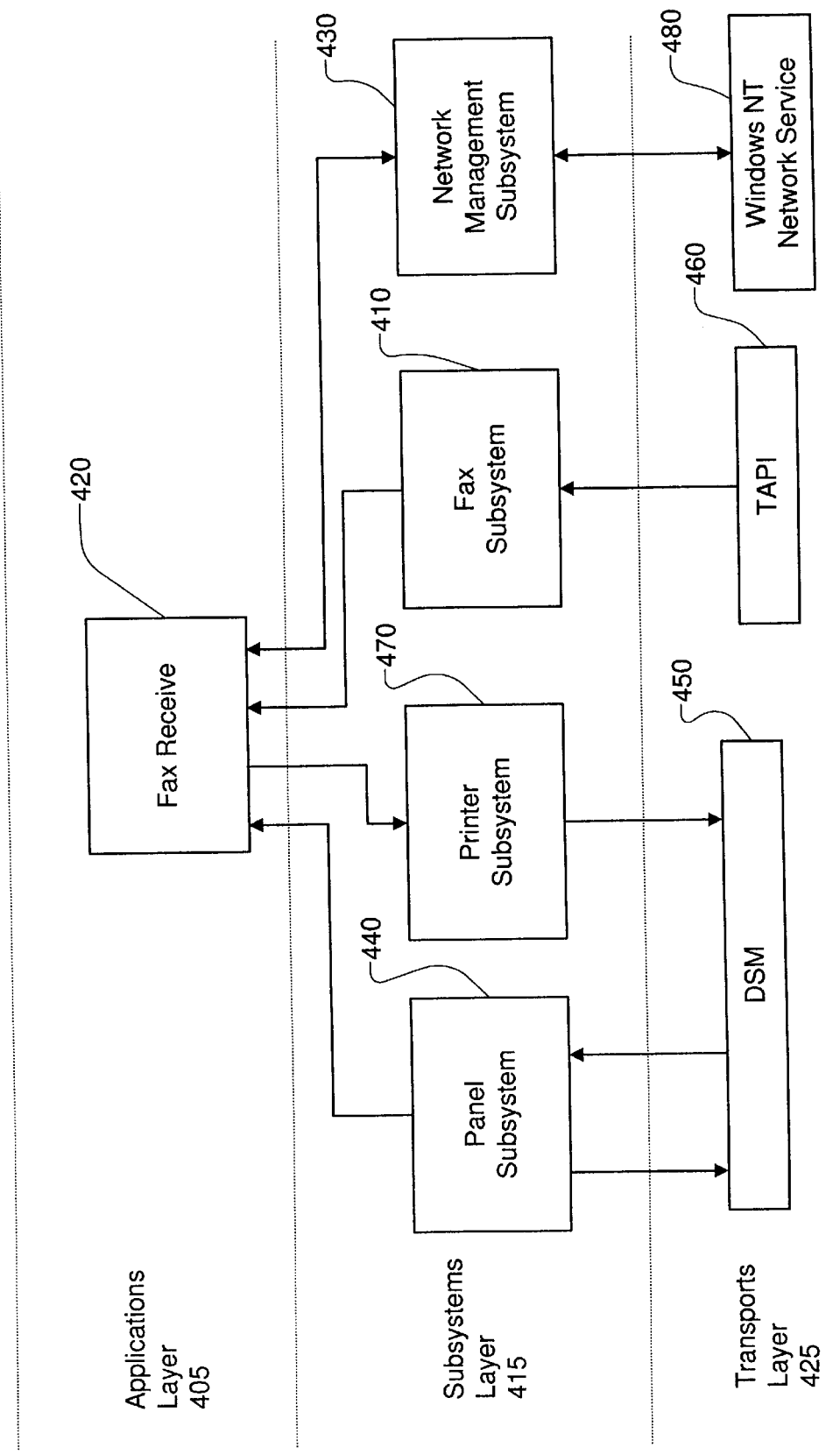
FIG. 4 is a block diagram of data flows in a system of the invention.

In conjunction with the description of the method of the invention, reference will be made to several functional units of the Host 110b and MFP 110a. These functional units are shown in FIG. 4. The functional units include applications, subsystems and transports, and are conceptually organized into an applications layer 405, a subsystems layer 415 and a transports layer 425. Applications are purely software programs which run on the Host 110b. Subsystems are comprised of hardware and/or software and are primarily for I/O, with some subsystem in the MFP 110a and others in the Host 110a, depending on their function. Transports are software interfaces between higher level functional units and the operating system.

One application which is most relevant here is a fax receive application 420. However, the Host 110b preferably also includes a fax send application, print application, and a scan application. All of these applications have access to the subsystems and transports as necessary to carry out their functions. For example, the print application administers the printing of print jobs received by the Host 110b from the workstations 150. Preferably, the print application utilizes a print queue in memory 250 which stores print jobs and their status (e.g., "pending," "printing," "error"). Preferably, the print queue is shared with the fax receive application 420, so that when fax messages are received they may controlled like a print job.

The fax receive application is run on the Host 110b and preferably stored in long term memory 280. The fax receive application 420 is responsive to control messages sent by the workstations 150 for controlling how received faxes are processed as well as control messages that may be sent from the MFP 110b as explained below. The fax receive application 420, in response to the control messages, can then act upon and respond differently to other functional units.

The subsystems include a panel subsystem 440, a printer subsystem 470, a fax subsystem 410 and a network management subsystem 430. The panel subsystem 440 includes the non-fixed display 225, user input device 230 and software stored in long term memory 285 to create a user interface for the MFP 110a. The printer subsystem 470 includes the paper bin 270, output tray 235, software stored in long term memory 285 and other components which together convert a rasterized print job into a printed document. The network management subsystem includes the LAN interface 215 and software stored in long term memory 280 for interfacing the Host 110b to the workstations 150 through the LAN 160.

The fax subsystem 410 is disposed in the Host 110b. The fax subsystem 410 includes the fax/modem 210, software stored in long term memory 280 and other components. The fax subsystem 410 converts fax messages received in a standard facsimile format such as Group I, Group II or Group III from the telephone line into digital data.

Three functional units in the transport layer are also provided. These include a DSM transport 450, a TAPI transport 460 and a network service transport 480.

The DSM transport 450 controls the communications interface 205, and thus communications between the Host 110b and the MFP 110a. TAPI, which stands for Telephony Advanced Programming Interface, is a Microsoft Corp. software layer which effectively insulates applications programs from modem and fax/modem hardware considerations.

TAPI defines both a single front end API to which applications developers write to access the Windows telephony features, and a single back-end SPI (Service Provider Interface) of how Windows accesses telephony hardware and telephony services. Thus, through the TAPI transport 460, TAPI-compliant applications can control the fax/modem 210 on a generic basis.

The network service transport 480 is software for implementing the NetBUI, TCP/IP and IPX/SPX and other transport protocols which are used in network 100 communications.

FIG. 4 also shows how data flows between the functional units. The fax receive application 420 receives commands from the panel subsystem 440 as well as the network management subsystem 430 and receives fax messages from the fax subsystem 410. The fax receive application 420 sends fax messages to the printer subsystem 470 for printing. The TAPI transport 460 provides the fax subsystem 410 with access to the fax/modem 210, over which the fax messages are received. The DSM transport 450 is used by the panel subsystem 440 and printer subsystem 470 to access and control the control panel 240 and to print.

Figure 3:
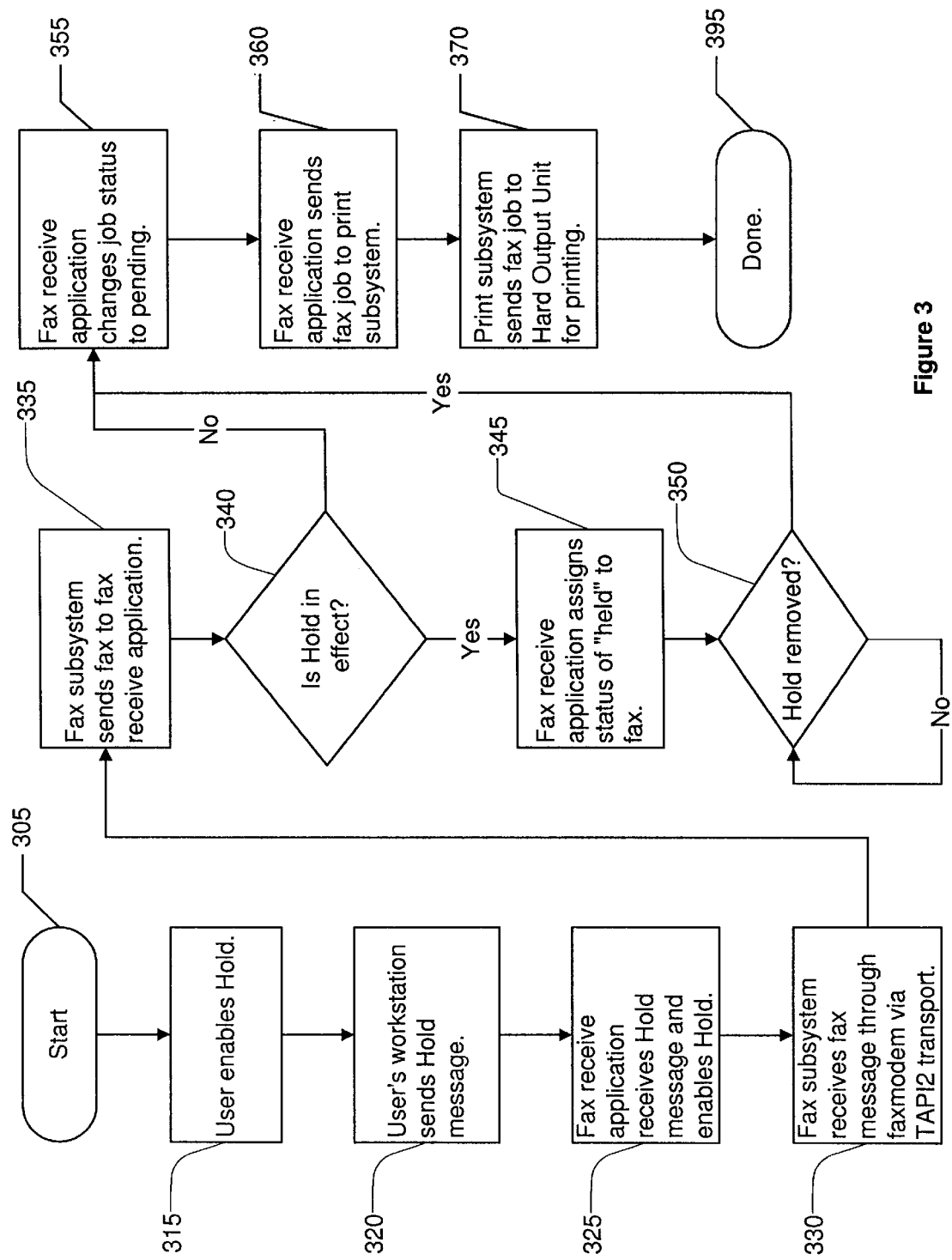
FIG. 3 is a flow chart of a method of temporarily holding received fax messages in accordance with the invention.

Referring now to FIG. 3 there is shown a flowchart of one method of the invention, wherein a user at his or workstation 150 or at the control panel 240 manually begins and later terminates the holding of received fax messages. With the start of the method (step 305), a user enables a 'hold' (step 315) for all messages. Preferably, the user may provide one or both of a start time and a stop time for the hold. A 'hold' message is then transmitted from the user either at his or her workstation 150 or the user interface 230 on the MFP 110a to the fax receive application 420 (step 320). The fax receive application 420 receives the 'hold' message and enables the hold (step 325).

At some time after the hold is enabled, the fax subsystem 415 may receive a fax message through the fax/modem via the TAPI transport 460 (step 330). When this occurs, the fax subsystem 410 transmits the fax message to the fax receive application 420, which places the fax message into a queue in memory 250 along with a job status of "received" (step 335). A determination is then made as to whether hold has been enabled (step 340). If it is, then the fax receive application 420 assigns the status of 'held' to the fax message (step 345). If it is not, then the process continues at step 355.

The job status of the fax message remains 'held' until such time that a 'hold remove' message is received by the fax receive application 420, together with an authenticating password if appropriate, as tested for in step 350. The 'hold remove' message may be received from the same workstation that originally provided the 'hold' message or, alternatively, the 'hold remove' message may originate from a different workstation, or from the control panel 240 on the MFP 110a. If the user selected a stop time for the hold, then either the workstation sends the 'hold remove' message at the appropriate time, or more preferably, the fax receive application 420 removes the hold itself. The fax receive application 420 then changes the job status of the fax message to 'pending' so that it may be printed (step 355).

In an alternative embodiment, the 'hold' message may be sent as two messages, a 'print' message and a 'release' message. Under this alternative, the 'print' message instructs the fax receive application 420 to print all fax messages then being held, but to continue holding all newly received fax messages. The 'release' message instructs the fax receive application to release the hold and print all newly received fax messages, but not to print any fax messages which are in the queue with a 'held' status.

In another alternative embodiment, it may be the case that only one or more specific parties (which may include the person originating the 'hold' message) will be authorized to release the hold. In that case the origin of the 'hold remove' message (via information which identifies the workstation) may or may not be considered sufficient authentication to allow the hold to be removed and the fax receive application 420 to change the job status for printing the fax message to 'pending' (step 355). Alternatively, the 'hold remove' message may originate from a different workstation, or from the user interface 230 on the MFP 110a, in which case a password or the like will be needed for authentication, before the fax receive application 420 changes the job status for printing the fax message to 'pending' (step 355).

Once the status of the fax message is 'pending' the fax receive application 420 sends the fax job (together with any other fax jobs that had been held) to the print subsystem 470 (step 360). The print subsystem 470 then sends all the fax jobs to the DSM 450 which then prints them (step 370). Thereafter the fax process operates routinely until the next time a user enables a hold.

Figure 5A:
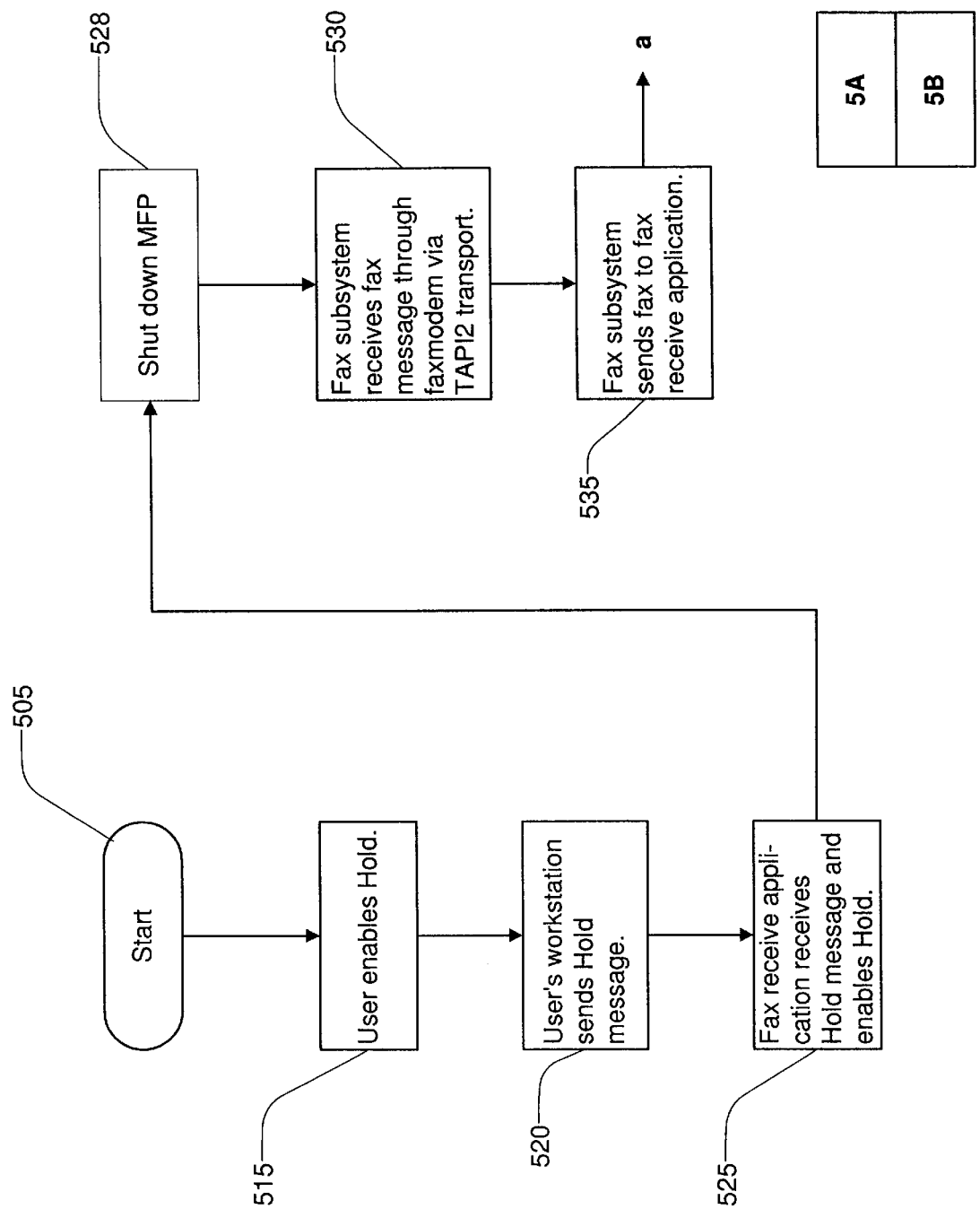
FIGS. 5A and 5B are a flow chart of an alternative method of temporarily holding received fax messages in accordance with the invention
Figure 5B:
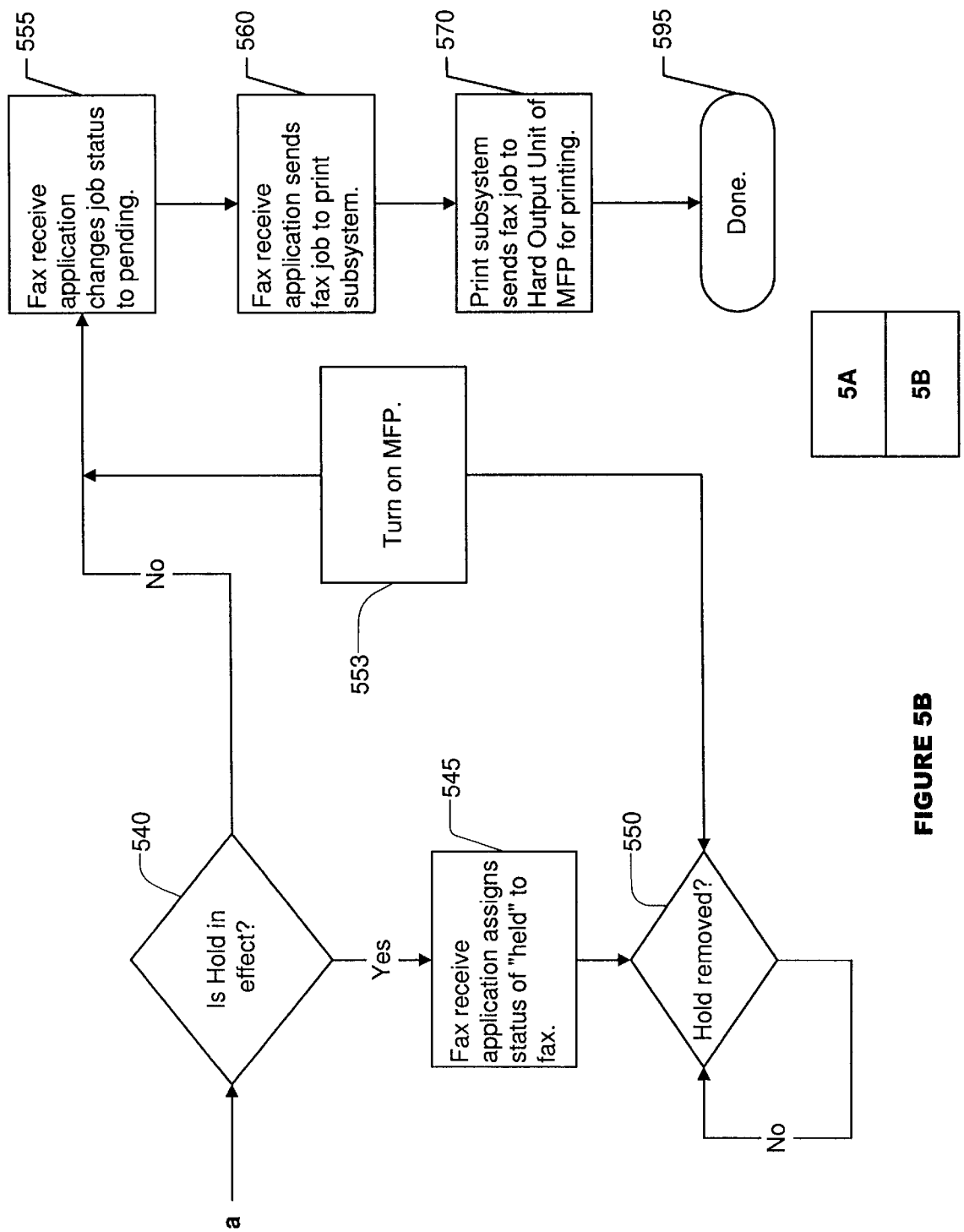
Figure 6A:
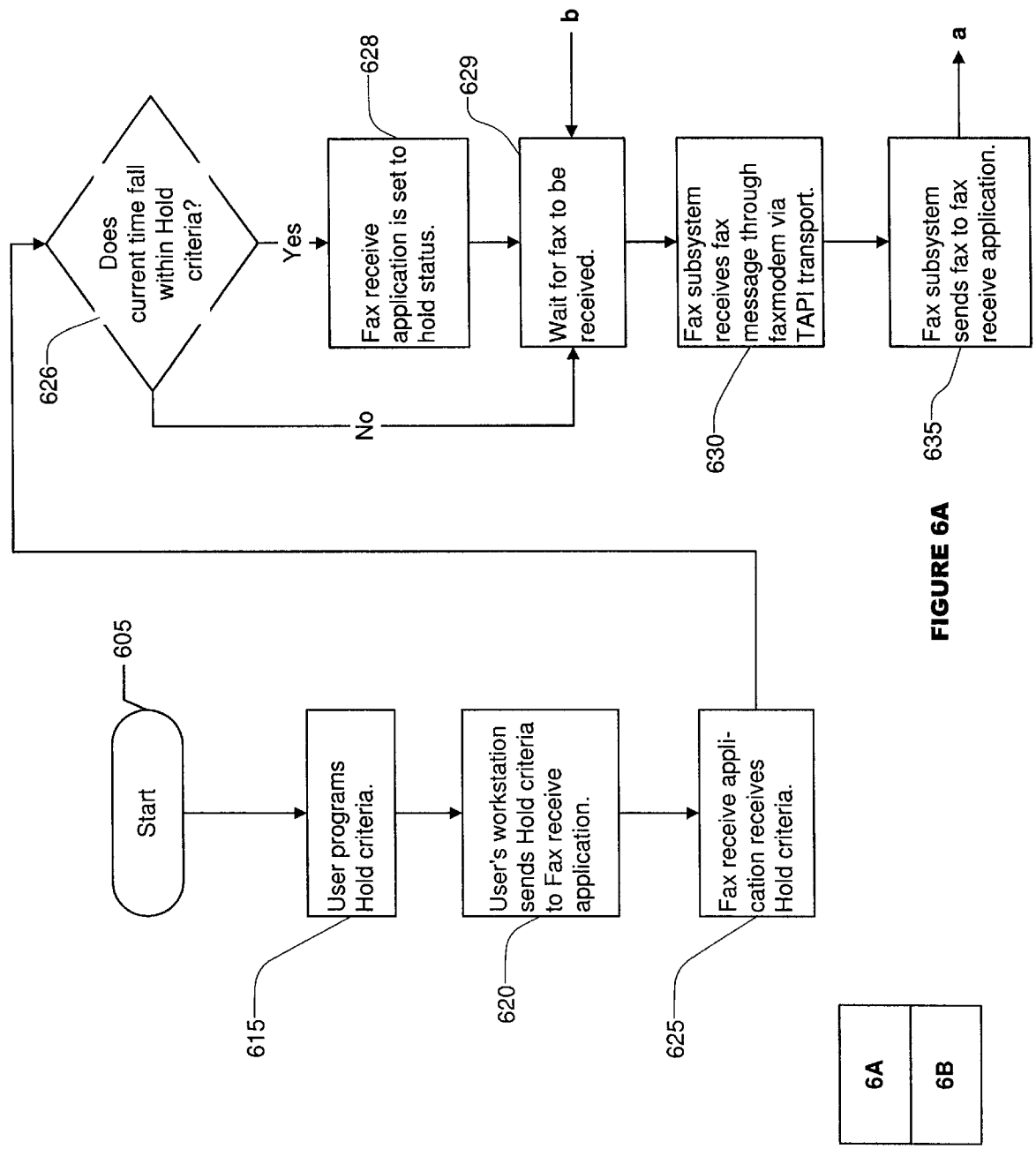
FIGS. 6A and 6B are a flow chart of an alternative method of temporarily holding received fax messages in accordance with the invention.
Figure 6B:
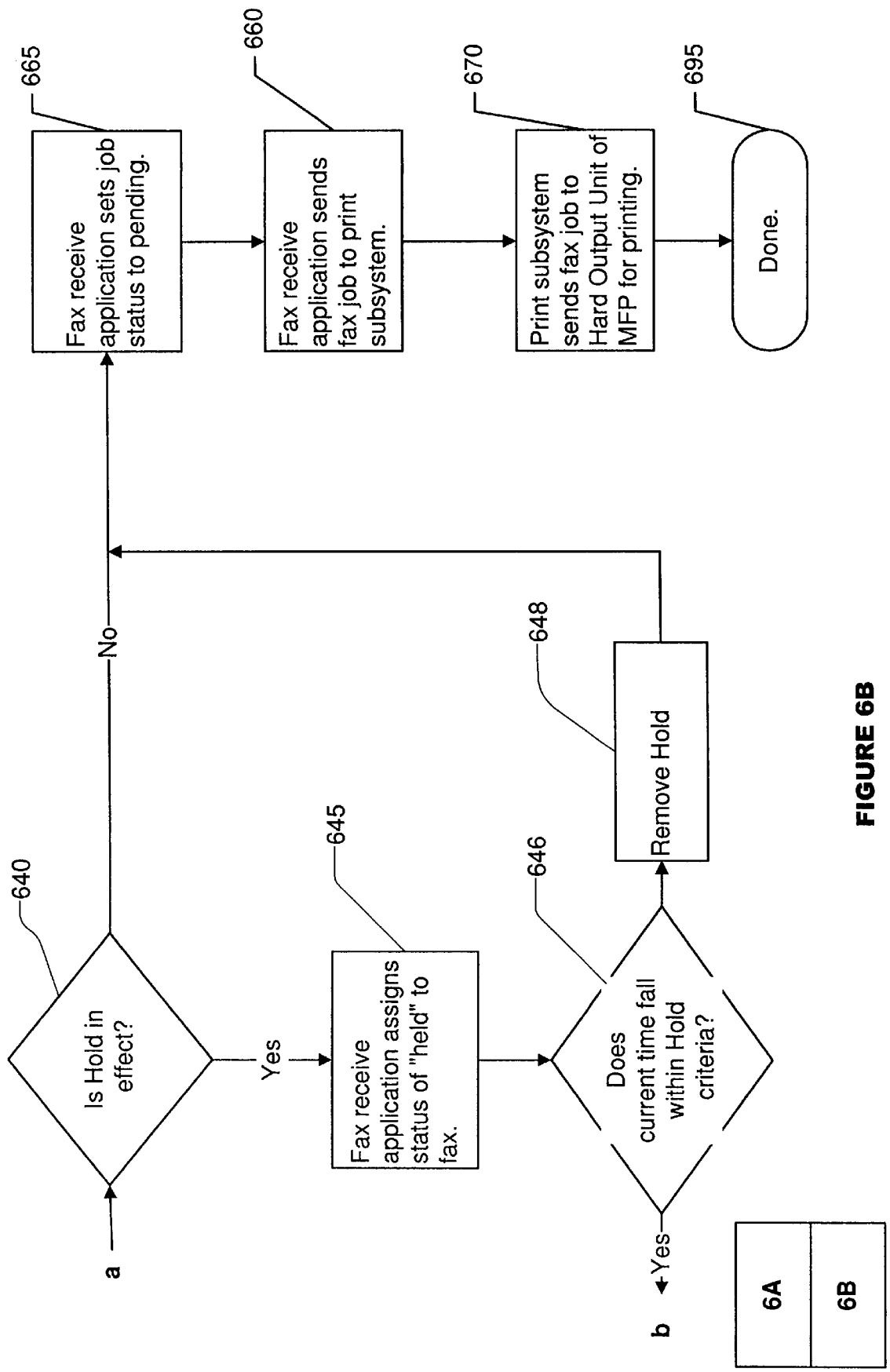

An alternate, power saving embodiment of the invention, is shown in FIG. 5. With the start of this method (step 505), a user enables a hold (step 515) for all messages. A 'hold' message is then transmitted from the user either at his or her workstation 150 or the control panel 240 on the MFP 110a to the fax receive application 420 (step 520). The fax receive application 420 receives the 'hold' message and enables the hold (step 525). At this time the MFP 110a is shut down electronically by the system (step 528). In the alternative, it may be shut down manually any time after the 'hold' message is transmitted.

At some time after the hold is enabled, the fax subsystem 415 may receive a fax message through the fax/modem via the TAPI transport 460 (step 530). When this occurs, the fax subsystem 410 transmits the fax message to the fax receive application 420 which stores the fax message in memory 250 (step 535). A determination is then made as to whether hold has been enabled (step 540). If it is, then the fax receive application 420 assigns the job status of 'held' to the fax message. If it is not, then the job status of 'pending' is assigned to the fax message and the process continues at step 555.

The job status of the fax message remains 'held' until such time that a 'hold remove' message is received by the fax receive application 420, as tested for in step 550. The 'hold remove' message may be received from the same workstation that originally provided the 'hold' message or, alternatively, the 'hold remove' message may originate from a different workstation, or from the control panel 240 on the MFP 110a. Either the MFP 110a is then turned on by its own power saving circuitry or an appropriate message is sent to the system administrator or other party responsible for turning the MFP 110a on (step 553). The fax receive application 420 then changes the job status for printing the fax message to 'pending' (step 555).

Once the job status of the fax message is 'pending' the fax receive application 420 sends the fax job (together with any other fax jobs that had been held) to the print subsystem 470 (step 560). The print subsystem 470 then sends all the fax jobs to the MFP 110a which then prints them (step 570). Thereafter the fax function operates routinely until the next time a user enables a hold.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A work group fax system comprising:
   (a) a data communications network;
   (b) a first general purpose computer workstation coupled to the data communications network, the first computer workstation including a control program, the control program including instructions for sending facsimile control messages, the facsimile control messages including:
      (i) a selective hold message for having all facsimile messages held which meet first criteria by a user of the workstation,
      (ii) a selective print message for printing all facsimile messages on hold which meet criteria specified by the user of the workstation,
      (iii) a selective release message for discontinuing a previously established hold on all facsimile messages which meet third criteria specified by the user of the workstation;
   (c) a facsimile machine comprising:
      (i) a control processor;
      (ii) a network interface coupled to the data communications network;
      (iii) a facsimile modem unit coupled to a telephone network for converting facsimile messages in facsimile compatible form into digital format;
      (iv) a message memory coupled to the control processor for receiving facsimile messages in digital format from the facsimile modem and for storing the facsimile messages for later retrieval;
      (v) a hard output unit for printing digital format facsimile messages;
      (vi) a program memory having stored therein programs for use by the control processor in controlling the operation of the facsimile machine, the program memory including a control program including instructions for:
   monitoring facsimile control messages received by the network interface,
   in response to the selective hold message, causing all facsimile messages received by the facsimile modem which meet the first criteria to be stored in a message memory of the facsimile machine,
   in response to the selective print message, causing all facsimile messages on hold which meet the second criteria to be routed for printing by the hard output unit,
   in response to the selective release message, causing all facsimile messages received by the facsimile modem which meet the third criteria to be routed for printing by the hard output unit.

2. a work group fax system as set forth in claim 1, wherein:
   the selective hold message includes a hold discontinue time; and
   the control program includes instructions for, in response to the presence of the hold discontinue time in the selective hold message, causing all facsimile messages received after the hold discontinue time to be routed for printing by the hard output unit.

3. A work group fax system as set forth in claim 1 further including a second general purpose computer workstation coupled to the data communications network, the second computer workstation including a copy of the control program of the first computer workstation for sending facsimile control messages;
   wherein the control program includes instructions for requiring predefined types of messages to have authentication; and for determining if authentication received is sufficient.

4. The work group fax system of claim 1, wherein the facsimile machine comprises a multifunction peripheral and a host which communicate through an interconnect.

5. A work group fax system as set forth in claim 1, wherein the facsimile machine further comprises a control panel, and the control program includes instructions for, in response to a predefined command from the control panel, causing all facsimile messages subsequently received by the facsimile modem to be routed for printing by the hard output unit.

6. A facsimile machine comprising:
   (a) a control processor;
   (b) a network interface coupled to a data communications network that is coupled to a general purpose computer;
   (c) a facsimile modem unit coupled to a telephone network for converting facsimile messages in facsimile compatible form into digital format;
   (d) a message memory coupled to the control processor for receiving facsimile messages in digital format from the facsimile modem and for storing the facsimile messages for later retrieval;
   (e) a hard output unit for printing digital format facsimile messages;

(f) a program memory having stored therein programs for use by the control processor in controlling the operation of the facsimile machine, the program memory including a control program including instructions for:
  monitoring facsimile control messages received by the network interface,
  in response to a selective hold message received from a control program of the general purpose computer, causing all facsimile messages received by the facsimile modem which meet a first criteria to be stored in the message memory,
  in response to a selective print message received from a control program of the general purpose computer, causing all facsimile messages on hold which meet a second criteria to be routed for printing by a hard output unit,
  in response to a selective release message received from a control program of the general purpose computer, causing all facsimile messages received by the facsimile modem which meet a third criteria to be routed for printing by the hard output unit.

7. The facsimile machine of claim 6, wherein the selective hold message includes a hold discontinue time; and
  the control program includes instructions for, in response to the presence of the hold discontinue time in the selective hold message, causing all facsimile messages received after the hold discontinue time to be routed for printing by the hard output unit.

8. The facsimile machine of claim 6, further comprising a control panel, and wherein the control program includes instructions for, in response to a predefined command from the control panel, causing all facsimile messages subsequently received by the facsimile modem to be routed for printing by the hard output unit.

9. The facsimile machine of claim 6, wherein
  the facsimile machine comprises a multifunction peripheral and a host which communicate through an interconnect;
  the message memory, the program memory, the network interface and the facsimile modem unit are disposed in the host;
  the hard output unit is disposed in the multifunction peripheral.

10. A computer-readable software program stored in program memory of a facsimile machine for controlling the operation of the facsimile machine, wherein the facsimile machine is coupled to a data communication network that includes a general purpose computer having a control program, the computer-readable software program including instructions for:
  monitoring facsimile control messages received by a network interface communicatively coupled to the facsimile machine,
  in response to a selective hold message received from the control program of the general purpose computer, causing all facsimile messages received by the facsimile machine which meet a first criteria to be stored in a message memory of the facsimile machine,
  in response to a selective print message received from the control program of the general purpose computer, causing all facsimile messages on hold which meet a second criteria to be routed for printing to a hard output unit,
  in response to a selective release message received from the control program of the general purpose computer, causing all facsimile messages received by the facsimile machine which meet a third criteria to be routed for printing by the hard output unit.

11. The computer-readable software program of claim 10, further including instructions for causing the facsimile machine to verify authorization criteria prior to acting upon a selective hold message.

12. The computer-readable software program of claim 10, wherein the selective hold message includes a hold discontinue time; and
  the program further includes instructions for, in response to the presence of the hold discontinue time in the selective hold message, causing all facsimile messages received after the hold discontinue time to be routed for printing by the hard output unit.

* * * * *